United States Patent
Komatsu

(10) Patent No.: US 8,262,956 B2
(45) Date of Patent: Sep. 11, 2012

(54) THIN CONTAINER PRODUCTION METHOD

(76) Inventor: Michio Komatsu, Fukushima (JP)

( * ) Notice: Subject to any disclaimer, the term of this patent is extended or adjusted under 35 U.S.C. 154(b) by 0 days.

(21) Appl. No.: 13/320,750

(22) PCT Filed: Jun. 14, 2010

(86) PCT No.: PCT/JP2010/060040
§ 371 (c)(1),
(2), (4) Date: Nov. 15, 2011

(87) PCT Pub. No.: WO2010/147084
PCT Pub. Date: Dec. 23, 2010

(65) Prior Publication Data
US 2012/0061876 A1  Mar. 15, 2012

(30) Foreign Application Priority Data
Jun. 18, 2009 (JP) ................. 2009-145108

(51) Int. Cl.
B29C 45/28 (2006.01)
(52) U.S. Cl. .................. 264/40.1; 264/328.8
(58) Field of Classification Search .......... 264/40.1, 264/328.1, 328.8, 328.17
See application file for complete search history.

(56) References Cited

U.S. PATENT DOCUMENTS

| | | | | |
|---|---|---|---|---|
| 4,380,426 | A * | 4/1983 | Wiles | 425/566 |
| 5,766,526 | A * | 6/1998 | Watanabe | 264/40.5 |
| 7,173,080 | B2 * | 2/2007 | Yamada et al. | 524/445 |
| 7,175,420 | B2 * | 2/2007 | Babin et al. | 425/564 |
| 7,897,092 | B2 * | 3/2011 | Shikuma et al. | 264/328.17 |

FOREIGN PATENT DOCUMENTS

| | | |
|---|---|---|
| JP | 2-310017 | 12/1990 |
| JP | 2006-137063 | 6/2006 |
| JP | 2007-152655 | 6/2007 |
| JP | 2007-296831 | 11/2007 |
| WO | WO 03/022927 | 3/2003 |

* cited by examiner

*Primary Examiner* — Jill Heitbrink
(74) *Attorney, Agent, or Firm* — Paul A. Guss

(57) ABSTRACT

The present invention provides a thin container production method capable of forming a thin container having a thickness of about 0.7 mm by injecting a molten resin of a polylactic acid into a narrow cavity. The production method according to the present invention produces a thin container W having a thickness in a range of 0.3 to 0.7 mm by injection molding of a polylactic acid resin. The molten resin of the polylactic acid impregnated with supercritical carbon dioxide in a range of 0.5 to 2.5 percent by mass relative to the total amount is injected into a cavity 29 corresponding to the thin container W.

5 Claims, 3 Drawing Sheets

THIN CONTAINER PRODUCTION METHOD

TECHNICAL FIELD

The present invention relates to a thin container production method that uses injection molding of a polylactic acid resin.

BACKGROUND ART

To reduce the burden on the environment of the synthetic resin waste, biodegradable resins, such as polylactic acid resin or the like, that can be decomposed by bacteria or other microorganisms in the soil or the like after disposal have recently been proposed.

There has been known a conventional method for producing a food container used as a cup, a bowl, a tray, or the like by injection molding of a polylactic acid resin (see Patent Literature 1, for example).

According to the above-described production method, the food container is formed by injecting a molten resin of a polylactic acid into a cavity defined by a female mold and a male mold opposed to the female mold, the female mold having a recess shaped to conform to the outer shape of the food container, and the male mold having a projection shaped to conform to the inner shape of the food container. The cavity provides a gap corresponding to the thickness of the food container between the recess and the projection. The above-described method can produce a thick container having a thickness of about 2.5 mm by injection molding. However, in the fields of the food containers, the single-use containers for medical purposes, powder storage containers and the like, production methods are desired to be capable of forming a thinner container having a thickness of about 0.7 mm, for example.

CITATION LIST

Patent Literature

Patent Literature 1: Japanese Patent Laid-Open No. 2006-137063

SUMMARY OF INVENTION

Technical Problem

However, it is difficult to fill a narrow cavity corresponding to a thin container having a thickness of about 0.7 mm to the distal end of the cavity with a molten resin of a polylactic acid by simply injecting the molten resin into the cavity.

Thus, to solve the difficulty, an object of the present invention is to provide a thin container production method capable of forming a thin container having a thickness of about 0.7 mm by injecting a molten resin of a polylactic acid into a narrow cavity.

Solution to Problem

The inventor has earnestly investigated means for filling a narrow cavity corresponding to the thin container to the distal end thereof with a molten resin of a polylactic acid when the molten resin is injected into the cavity. As a result, the inventor has found that a molten resin of a polylactic acid impregnated with supercritical carbon dioxide in an amount within a particular range has an increased flowability and can fill even the narrow cavity described above to the distal end thereof when injected into the cavity, and has devised the present invention based on the finding.

To attain the object described above, the present invention provides a thin container production method to produce a thin container having a thickness in a range of 0.3 to 0.7 mm by injection molding of a polylactic acid resin, characterized in that a molten resin of a polylactic acid impregnated with supercritical carbon dioxide in a range of 0.5 to 2.5 percent by mass relative to the total amount is injected into a cavity corresponding to the thin container.

According to the present invention, since the molten resin of the polylactic acid is impregnated with the supercritical carbon dioxide in an amount within the range described above relative to the total amount of the molten resin of the polylactic acid, the flowability of the molten resin can be improved. As a result, when the molten resin is injected into the cavity corresponding to the thin container, the cavity can be filled to the distal end thereof with the molten resin.

According to the present invention, if the amount of the supercritical carbon dioxide with which the molten resin of the polylactic acid is impregnated is less than 0.5 percent by mass of the total amount of the molten resin of the polylactic acid, the flowability of the molten resin cannot be sufficiently improved. On the other hand, if the amount of the supercritical carbon dioxide with which the molten resin of the polylactic acid is impregnated is more than 2.5 percent by mass of the total weight of the molten resin of the polylactic acid, the smoothness of the surface of the molded thin container is degraded because of defoaming occurring on the surface, although the flowability of the molten resin can be further improved.

The polylactic acid used in the present invention may not contain filler but be effectively composed only of the polylactic acid. Alternatively, the polylactic acid may be a polylactic acid containing resin composition that contains not less than 50 percent by mass of a polylactic acid and 1 to 28 percent by mass of inorganic filler prepared in a nanocomposite form. The inorganic filler may be a layered silicate having an average layer thickness of 1 to 100 nm and a major diameter of 150 nm or less.

According to the present invention, if the thickness of the thin container is less than 0.3 mm, the cavity cannot be filled to the distal end thereof with the molten resin of the polylactic acid, so that the thin container is partially chipped. On the other hand, if the thickness of the thin container is more than 0.7 mm, the flowability of the molten resin of the polylactic acid does not have to be improved.

As an alternative to the carbon dioxide used as the supercritical fluid with which the polylactic acid is impregnated, nitrogen can be contemplated. However, if nitrogen is used as the supercritical fluid, the flowability of the molten resin of the polylactic acid when injected into the narrow cavity cannot be sufficiently improved, although the mechanism is not known.

According to the present invention, the molten resin of the polylactic acid is preferably injected into a plurality of cavities formed in a mold to produce a plurality of thin containers by one injection operation. According to the present invention, the molten resin of the polylactic acid has high flowability and therefore can be injected into the plurality of cavities at the same time. Thus, the plurality of thin containers can be efficiently produced by one injection operation.

However, when the molten resin of the polylactic acid impregnated with supercritical carbon dioxide is injected into a plurality of cavities, each of the cavities sometimes cannot be uniformly filled with the molten resin, and thus, the individual thin containers cannot be uniformly formed. A possible reason for this is that the individual cavities slightly vary in size because of the processing accuracy, the condition of mating of the mold parts or the like even though each of the plurality of cavities is formed to be uniform. Another possible reason is that, depending on the relationship between the direction of flow and the direction of gravity of the molten resin injected into each cavity, for example, the conditions of the remaining air pushed out of the cavities by the molten resin vary.

For these reasons, the times required for the molten resin injected into the cavities to reach the distal end thereof probably vary between the cavities.

Thus, according to the present invention, opening and closing of a gate to the cavity is preferably performed by an electromagnetic on-off valve. The electromagnetic on-off valve is superior to a hydraulic valve in response speed and therefore can open the gate to each cavity at an appropriate time based on the time required for the molten resin injected into the cavity to reach the distal end of the cavity. As a result, the molten resin can be uniformly charged into the plurality of cavities in one injection operation, and therefore, the thin containers can be uniformly formed.

In order to appropriately control the time of opening of the gate to each cavity, the electromagnetic on-off valve preferably has an opening speed in a range of 0.2 to 0.3 m/s. If the opening speed of the electromagnetic on-off valve is lower than 0.2 m/s, the time of opening of the gate to each cavity sometimes cannot be appropriately controlled. An opening speed of the electromagnetic on-off valve higher than 0.3 m/s is mechanically difficult to achieve.

Specifically, opening of the gate to each cavity by the electromagnetic on-off valve can be achieved by measuring, for each cavity, the time required for the molten resin of the polylactic acid injected into each cavity to reach a distal end of the cavity from the gate and controlling the time of opening of the gate to each cavity by the electromagnetic on-off valve based on the measured time.

According to the present invention, the thin container preferably has a thickness in a range of 0.5 to 0.7 mm. If thickness of the thin container falls within the range, the thin container can comprise a foamed layer on the inside and a non-foamed layer on the outside and thus can have heat insulating properties and heat retaining properties.

According to the present invention, the thin container may be a container selected from a group consisting of a food container, a single-use container for medical purposes, and a powder storage container, for example. The food container may be a food container selected from a group consisting of an ice cream container, a pudding container, a cake cup, a yogurt cup, a tofu (bean curd) container, a margarine container, a container for fish eggs, a salad container, a cooked food container and a drink cup.

DESCRIPTION OF EMBODIMENTS

Figure 1:
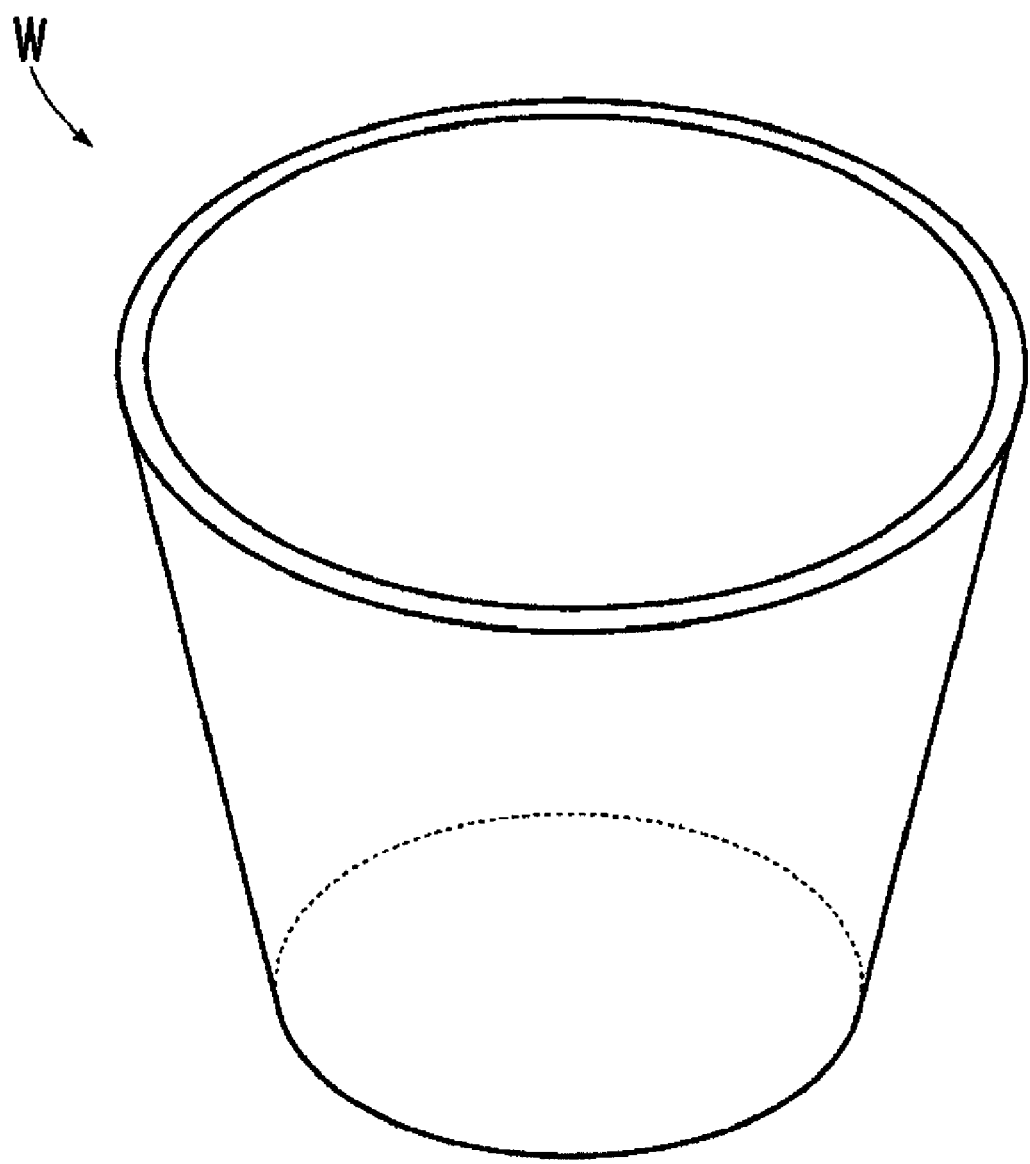
FIG. 1 is a perspective view for illustrating a thin container (molded product) formed by an injection molding method according to an embodiment.

Now, an embodiment of the present invention will be described in detail with reference to the accompanying drawings. First, a thin container (molded product), which is an injection molded article of a polylactic acid resin produced according to a production method according to this embodiment, will be described. The thin container that is an injection molded article of the polylactic acid resin may be, for example, a food container, such as an ice cream container W shown in FIG. 1.

The ice cream container W is a bottom-closed cylindrical body that opens at one end and expands in diameter from the bottom to the opening. The ice cream container W has a thickness in a range of 0.3 to 0.7 mm.

Next, an injection molding apparatus used for the production method according to this embodiment will be described. An injection molding apparatus 11 shown in FIG. 2 comprises a cylinder 13 that delivers the polylactic acid resin to a mold 12, a rotary shaft part 14 disposed in the cylinder 13, and a motor 15 that rotationally drives the rotary shaft part 14.

The cylinder 13 comprises a hopper 16 and a supercritical fluid supplying part 17. The hopper 16 is used for supplying the polylactic acid resin into the cylinder 13 at a position close to the end opposite to the mold 12, and the supercritical fluid supplying part 17 is used for supplying supercritical carbon dioxide into the cylinder 13 at a position close to the middle of the cylinder 13 and downstream of the hopper 16.

The supercritical fluid supplying part 17 comprises a supercritical fluid producing device 18 that produces supercritical carbon dioxide, a fluid conduit 19 through which the supercritical carbon dioxide produced by the supercritical fluid producing device 18 is delivered to the cylinder 13, and a metering device 20 mounted midway on the fluid conduit 19. The fluid conduit 19 is connected to the cylinder 13 with a shut-off valve 21 interposed therebetween.

The cylinder 13 further comprises a nozzle 22 at the tip end, which is the end closer to the mold 12, and a plurality of heating devices 23a arranged on the outer surface. The nozzle 22 comprises a heating device 23b on the outer surface and is connected to the mold 12 with a shut-off valve 24 interposed therebetween.

The rotary shaft 14 is connected to the motor 15 at the end opposite to the mold 12 and comprises a helical screw thread 25 formed on the outer surface and a screw head 26 formed at the tip end, which is the end closer to the mold 12. The screw thread 25 comprises a root-side continuous screw thread 25a formed in a section between the end closer to the motor 15 and a section before the section below the supercritical fluid supplying part 17 to extend below the hopper 16, a discontinuous screw thread 25b formed in a section below the supercritical fluid supplying part 17, and a tip-side continuous screw thread 25c formed in a section between the screw head 26 and the discontinuous screw thread 25b. The discontinuous screw thread 25b is a section in which the screw thread 25 is intermittently formed at predetermined intervals along the rotary shaft 14 in the circumferential direction, and the discontinuous screw thread 25b comprises a plurality of discontinuous parts between the intermittently formed screw thread 25.

The mold 12 comprises a female mold part 27 having a plurality of recesses 27a shaped to conform to the outer shape of the ice cream container W and a male mold part 28 having a plurality of projections 28a shaped to conform to the inner shape of the ice cream container W produced by the injection molding apparatus 11. The mold 12 has a plurality of cavities 29 defined by the plurality of recesses 27a and the plurality of projections 28a. The injection molding apparatus 11 according to this embodiment has six cavities 29.

In the injection molding apparatus 11, a plurality of female mold parts 27 and a plurality of male mold parts 28 machined to have gaps of each cavity 29 ranging from 0.3 to 0.7 mm are prepared. From among them, a female mold part 27 and a male mold part 28 having a desired gap can be fitted based on the thickness of the ice cream container W.

Figure 3:
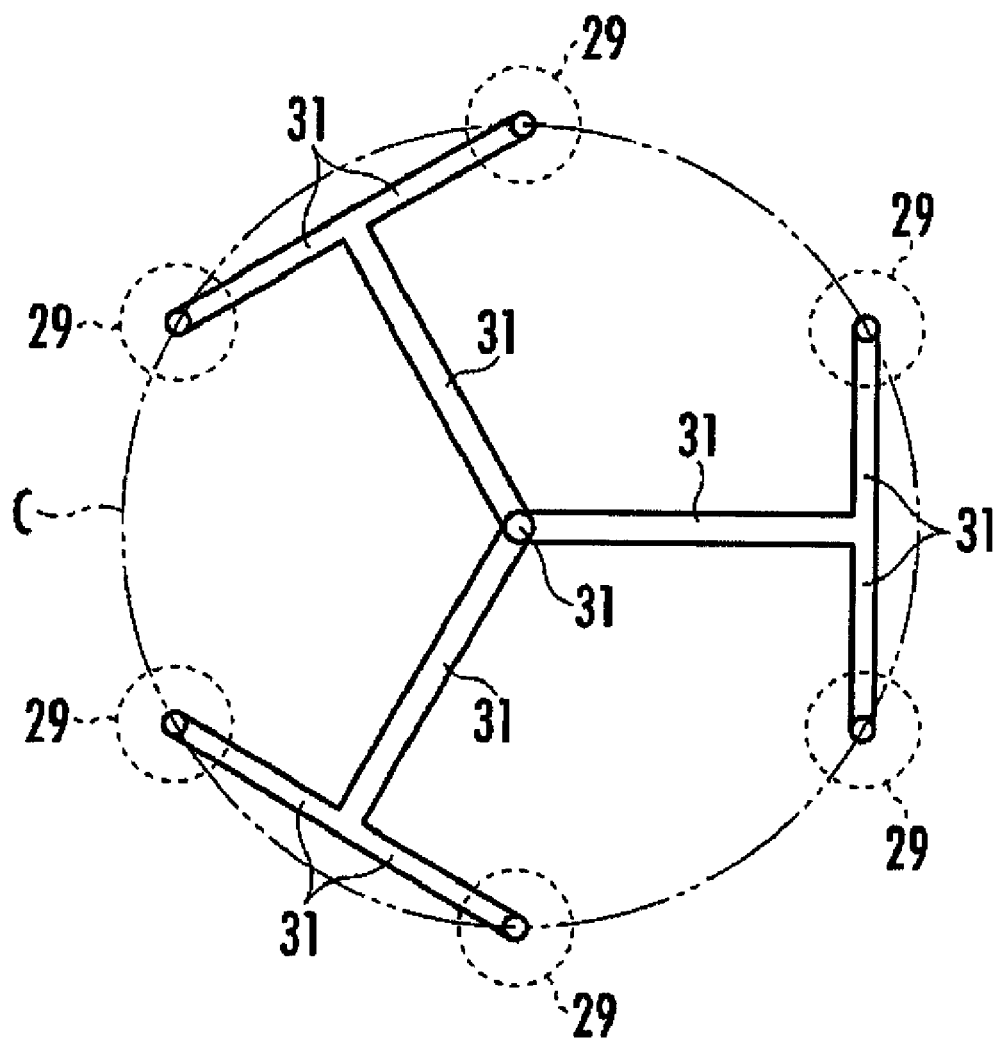
FIG. 3 is a side view for illustrating an arrangement of cavities in the injection molding apparatus shown in FIG. 2.

The nozzle 22 of the injection molding apparatus 11 is connected to gates 32 opening into the respective cavities 29 by a hot runner 31, which is divided into three branches at the tip end, each of which is further divided into two sub-branches at the tip end. The hot runner 31 is formed in a branch plate 33 disposed in the female mold part 27. As shown in FIG. 3, the cavities 29 are arranged at equal intervals on a circle Cabout the connection of the hot runner 31 to the nozzle 22.

Behind each sub-branch, there is provided an electromagnetic on-off valve that comprises a solenoid 34 connected to a power supply (not shown) and a valve pin 35 capable of being moved back and forth by turning on and off energization of the solenoid 34. Energization of each solenoid 34 can be independently controlled by a controller (not shown).

The electromagnetic on-off valve is designed to close the gate 32 by moving forward the valve pin 35 and to open the gate 32 by moving backward the valve pin 35. That is, the gate 32 to each cavity 29 is independently opened and closed by the controller operating the electromagnetic on-off valve.

Next, a method of producing the ice cream container W according to this embodiment with the injection molding apparatus 11 will be described. With the injection molding apparatus 11, first, the polylactic acid resin is input from the hopper 16 into the cylinder 13. The polylactic acid resin may be a material that contain no filler and is substantially composed only of a polylactic acid, for example. Alternatively, the polylactic acid resin may be a polylactic acid containing resin composition that contains 50 percent by mass or more of a polylactic acid and 1 to 28 percent by mass of inorganic filler prepared in a nanocomposite form. The inorganic filler may be a layered silicate having an average layer thickness of 1 to 100 nm and a major diameter of 150 nm or less.

The polylactic acid resin that contains no filler and is substantially composed only of a polylactic acid may be TERRAMAC (registered trademark) TE-2000 available from UNITIKA. LTD., for example.

The polylactic acid resin is melted in the cylinder 13 under heating by the heating devices 23a while being agitated by the continuous screw thread 25a, and the resulting molten resin is delivered toward the mold 12.

Then, the supercritical fluid supplying part 17 supplies carbon dioxide, which is a supercritical fluid that does not react with the polylactic acid resin, to the molten resin. In this step, supercritical carbon dioxide is supplied so that the polylactic acid resin is impregnated with carbon dioxide in a range of 0.5 to 2.5 percent by mass relative to the polylactic acid resin.

The supercritical carbon dioxide is agitated by the discontinuous screw thread 25b disposed at a section below the supercritical fluid supplying part 17 and thus is sufficiently mixed with the molten resin. As a result, in the part of the cylinder 13 between the screw head 26 and the nozzle 22, a single phase solution of the polylactic acid resin containing a mixture of the molten resin and the supercritical carbon dioxide is prepared. At this point, nuclei for foaming have not been formed yet in the single phase solution.

Then, the valve pins 35 for the cavities 29 are moved forward to close the gate 32, and in this state, the single phase solution of the polylactic acid resin containing the mixture of the molten resin and the supercritical carbon dioxide is injected through the nozzle 22. In this step, the pressure in the nozzle 22 is lower than the pressure in the cylinder 13, so that a nucleus for foaming is formed in the single phase solution while the solution is passing through the nozzle 22. Note that the single phase solution fills the hot runner 31 but does not reach the cavities 29 since the gates 32 are closed.

Then, after a lapse of a predetermined time since the start of the injection, the controller operates the electromagnetic on-off valve to move backward the valve pins 35 for the cavities 29, thereby opening the gates 32.

The mold 12 of the injection molding apparatus 11 is machined so that the gaps of each of the plurality of cavities 29 are uniform. In actual, however, the cavities 29 slightly vary in size because of the machining precision, the condition of mating and the like of the mold 12. In some cases, in each cavity 29, depending on the relationship between the direction of flow of the molten resin and the direction of gravity, for example, the conditions of the remaining air pushed out of the cavities 29 by the molten resin may vary. As a result, the times required for the molten resin to reach the distal end of the cavities 29 from the gates 32 vary between the cavities 29.

Thus, opening of the plurality of gates 32 is independently controlled so as to respond to the time required for the molten resin in each cavity 29 to reach the distal end of the cavity 29 from the gate 32. The time required for the molten resin in each cavity 29 to reach the distal end of the cavity 29 from the gate 32 is known from a previous test injection.

The injection molding apparatus 11 according to this embodiment uses the electromagnetic on-off valves having a quick response to open and close the gate 32 for each cavity 29. The quick response of the electromagnetic on-off valve is indicated by its opening speed. With the injection molding apparatus 11 according to this embodiment, the electromagnetic on-off valves preferably have an opening speed in a range of 0.2 to 0.3 m/s, for example, an opening speed of 0.25 m/s. With such electromagnetic on-off valves, the cavities 29 can be uniformly filled with the single phase solution injected into the cavities 29 through the opened gates 32.

After a lapse of a further predetermined time, the valve pins 35 for the cavities 29 are moved forward to close the gates 32, thereby stopping the injection. In this step, closing of each gate 32 is independently performed by the electromagnetic on-off valve as with the opening thereof. Then, the single phase solution injected into the cavities 29 is cooled by the mold 12.

The injected single phase solution contains the polylactic acid resin impregnated with carbon dioxide in a range of 0.5 to 2.5 percent by mass relative to the polylactic acid resin and therefore can fill the cavities 29 to their respective narrow distal ends and have a sufficient flowability to uniformly fill the plurality of cavities 29.

In the case where the gap of each cavity 29 between the recess 27a and the projection 28a is in a range of 0.5 to 0.7 mm, the single phase solution injected into the cavity 29 fills the cavity 29 to the distal end thereof. In addition, in a part of the single phase solution that is to form the inner side of the thin container, foaming occurs to form a foamed layer. And a part of the single phase solution that is to form the outer side of the thin container is cooled and set to form a non-foamed layer. As a result, the thin container comprises the foamed layer on the inside and the non-foamed layer on the outside and therefore can have heat insulating properties and heat retaining properties.

In the case where the gap of each cavity 29 between the recess 27a and the projection 28a is about 0.3 to 0.5 mm, the single phase solution injected into the cavity 29 fills the cavity 29 to the distal end thereof and is cooled and solidified as a whole. As a result, the whole of the thin container is a non-foamed body.

The mold 12 is opened, and then, the thin container can be removed from the mold 12 as the product ice cream container W.

As described above, according to the production method according to this embodiment using the injection molding apparatus 11, a plurality of ice cream containers W having a thickness in a range of 0.3 to 0.7 mm, a smooth outer surface and a good appearance can be formed by one injection operation. In addition, according to the production method according to this embodiment, the ice cream containers W can be uniformly injection-molded without variations.

With regard to this embodiment, a case where the thin container that is the injection molded article of the polylactic acid resin is an ice cream container W has been described as an example. However, the thin container may be used as other food containers, such as a pudding container, a cake cup, a yogurt cup, a tofu (bean curd) container, a margarine container, a container for fish eggs, such as salmon roe and herring roe, a salad container, a cooked food container and a drink cup. As a further alternative, the thin container may be used as a container for a urinalysis cup or other single-use container for medical purposes, or a powder storage container, instead of the food containers.

With regard to this embodiment, a case where the female mold part 27 of the mold 12 comprises a plurality of recesses 27a, and the male mold part 28 comprises a plurality of projections 28a has been described as an example. Alternatively, however, the female mold part 27 and the male mold part 28 of the mold 12 may comprise a single recess 27a and a single projection 28a, respectively.

Next, an example 1 and a comparative example will be described.

Example 1

Figure 2:
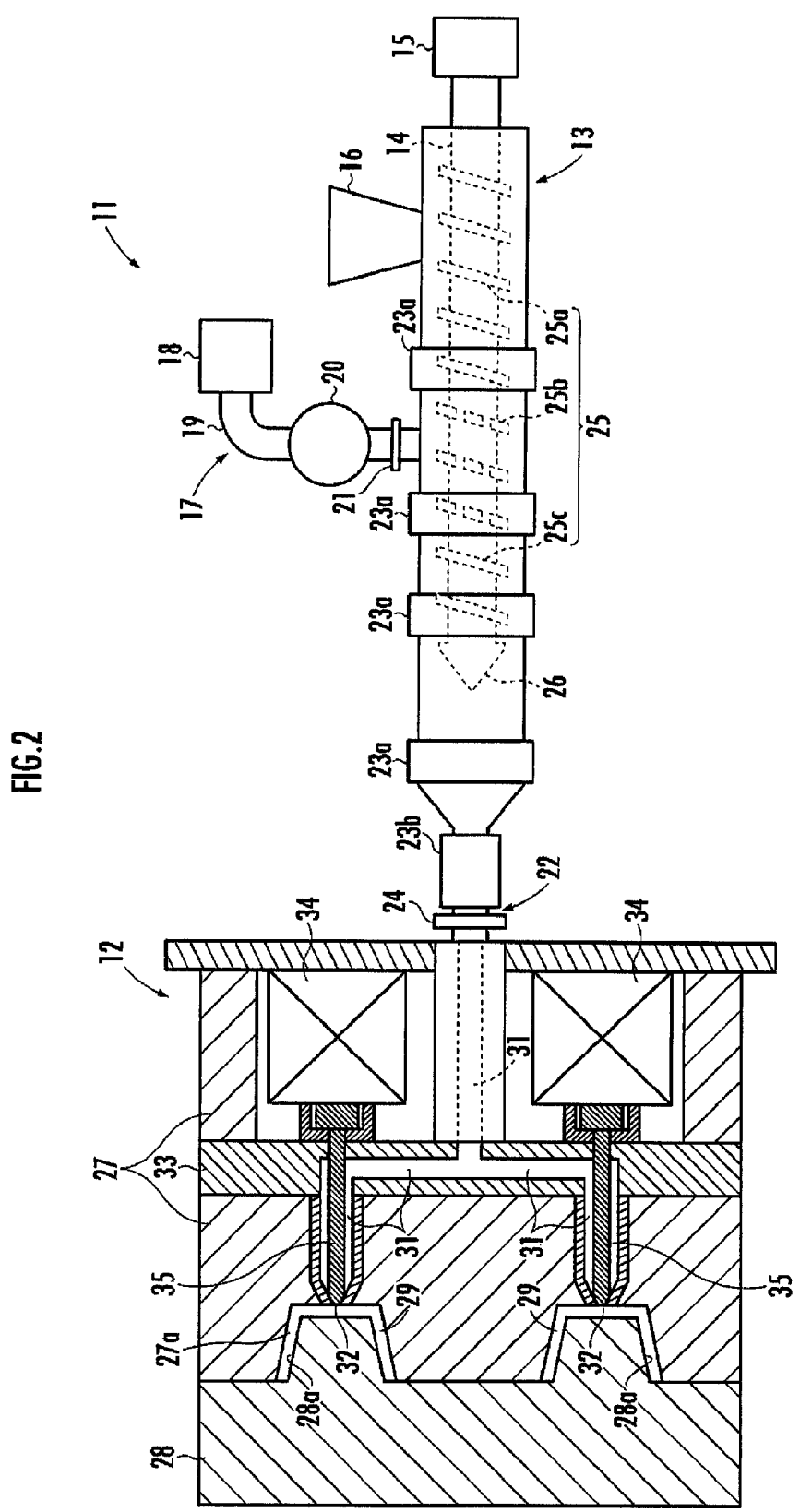
FIG. 2 is a front view for illustrating the whole of an injection molding apparatus that performs the injection molding method according to the embodiment.

In this example, the ice cream container W having the shape shown in FIG. 1 was produced by the injection molding apparatus 11 shown in FIG. 2. The injection molding apparatus 11 is an apparatus used for producing the ice cream container W having the shape shown in FIG. 1, and the injection molding apparatus 11 is fitted with a mold 12 having six cavities 29 each corresponding to the ice cream container W. The ice cream container W had an opening having an outer diameter of 68 mm and a bottom having an outer diameter of 45 mm and had a height of 50 mm and a thickness of 0.7 mm.

In this example, first, a molten polylactic acid resin (TERRAMAC (registered trademark) TE-2000 available from UNITIKA. LTD.) was impregnated with supercritical carbon dioxide in an amount of 0.5 percent by mass relative to the polylactic acid resin, thereby preparing a single phase solution of the polylactic acid resin mixed with the supercritical carbon dioxide. The polylactic acid resin used in this example was substantially composed only of the polylactic acid and contained no inorganic filler.

Then, the valve pin 35 for each cavity 29 was moved forward to close the gate 32, and in this state, the single phase solution of the polylactic acid resin was injected from the nozzle 22. Then, 0.1 seconds after the start of the injection from the nozzle 22, the valve pin 35 for each cavity was moved backward by the electromagnetic on-off valve to open the gate 32, thereby starting injection of the single phase solution into each cavity 29. The backward movement of the valve pin 35 was independently performed by each electromagnetic on-off valve in response to the variations of the time required for the single phase solution in the cavities 29 to reach the distal ends of the respective cavities 29 from their respective gates 32.

Then, 1.8 seconds after the start of the injection from the nozzle 22, the valve pin 35 for each cavity 29 was moved forward to close the gate 32, thereby stopping injection of the single phase solution. The forward movement of the valve pin 35 of each electromagnetic on-off valve was independently performed in response to the variations of the time required for the single phase solution in the cavities 29 to reach the distal ends of the respective cavities 29 from their respective gates 32.

The single phase solution was injected under conditions that the cylinder temperature was 210° C., the injection pressure was 100 MPa, and the injection speed was 80 mm/s. The surface temperature of the cavities 29 of the mold 12 was 30° C., and the back pressure was 17 MPa.

In this example, six ice cream containers W having a smooth outer surface and good appearance could be formed by one injection operation. In addition, the ice cream containers W could be uniformly injection-molded without variations.

Comparative Example 1

In this comparative example, six ice cream containers W having the shape shown in FIG. 1 were produced experimentally by one injection operation by performing injection of the single phase solution in basically the same way as in the example 1 except that the polylactic acid resin was not impregnated with supercritical carbon dioxide.

However, the ice cream containers W produced in this comparative example were deficient products because the distal end part of the cavity 29, which would otherwise form the open part of the container, was partially chipped by not being filled with the single phase solution.

Comparative Example 2

In this comparative example, six ice cream containers W having the shape shown in FIG. 1 were produced experimentally by one injection operation by performing injection of the single phase solution in basically the same way as in the example 1 except that the polylactic acid resin is impregnated with supercritical carbon dioxide in an amount of 3.0 percent by mass relative to the polylactic acid resin.

However, the ice cream containers W produced in this comparative example were deficient as products because of defoaming occurring on the outer surface and degrading the smoothness of the surface, resulting in poor appearance.

REFERENCE SIGNS LIST 12 mold
29 cavity
32 gate
W thin container

The invention claimed is:
1. A thin container production method to produce a thin container having a thickness in a range of 0.3 to 0.7 mm by injection molding of a polylactic acid resin,
characterized in that a molten resin of a polylactic acid resin impregnated with supercritical carbon dioxide in a range of 0.5 to 2.5 percent by mass relative to the total amount is injected into a plurality of cavities corresponding to the thin container disposed in a mold, and each of opening and closing of a gate to each cavity is performed by an electromagnetic on-off valve for producing a plurality of thin containers by one injection operation, and a time period required for the molten resin of the polylactic acid injected into each cavity to reach a distal end of the cavity from the gate is measured, and a time of opening of the gate to each cavity by the electromagnetic on-off valve is controlled based on the measured time period.

2. The thin container production method according to claim 1, characterized in that said electromagnetic on-off valve has an opening speed in a range of 0.2 to 0.3 m/s.

3. The thin container production method according to claim 1, characterized in that said thin container has a thickness in a range of 0.5 to 0.7 mm.

4. The thin container production method according to claim 1, characterized in that said thin container is a container selected from a group consisting of a food container, a single-use container for medical purposes, and a powder storage container.

5. The thin container production method according to claim 2, characterized in that said food container is a food container selected from a group consisting of an ice cream container, a pudding container, a cake cup, a yogurt cup, a tofu (bean curd) container, a margarine container, a container for fish eggs, a salad container, a cooked food container and a drink cup.

* * * * *